(12) United States Patent
Anandakumar et al.

(10) Patent No.: US 8,634,485 B2
(45) Date of Patent: Jan. 21, 2014

(54) FAST RESYNCHRONIZATION FOR RECEPTION IN TIME SLICING

(75) Inventors: Anand K. Anandakumar, Carlsbad, CA (US); Sridhar Ramesh, Carlsbad, CA (US)

(73) Assignee: MaxLinear, Inc., Carlsbad, CA (US)

( * ) Notice: Subject to any disclaimer, the term of this patent is extended or adjusted under 35 U.S.C. 154(b) by 0 days.

(21) Appl. No.: 12/974,530

(22) Filed: Dec. 21, 2010

(65) Prior Publication Data

US 2012/0002767 A1   Jan. 5, 2012

Related U.S. Application Data

(60) Provisional application No. 61/289,272, filed on Dec. 22, 2009.

(51) Int. Cl.
*H04K 1/10* (2006.01)
*H04L 27/28* (2006.01)

(52) U.S. Cl.
USPC ........... 375/260; 375/316; 375/324; 375/340; 375/354; 375/355

(58) Field of Classification Search
USPC .......... 375/260, 317, 324, 340, 354, 355, 316
See application file for complete search history.

(56) References Cited

U.S. PATENT DOCUMENTS

| 2003/0053411 | A1 | 3/2003 | Jacobsen |
| 2005/0152326 | A1 | 7/2005 | Vijayan et al. |
| 2005/0163262 | A1 | 7/2005 | Gupta |
| 2007/0053281 | A1 | 3/2007 | Schwoerer |
| 2007/0053448 | A1 | 3/2007 | Schwoerer et al. |
| 2009/0059885 | A1* | 3/2009 | Sadek et al. ................. 370/343 |
| 2011/0002403 | A1* | 1/2011 | Wilhelmsson et al. ....... 375/260 |

OTHER PUBLICATIONS

International Preliminary Report on Patentability for Application No. PCT/US2010/061629 mailed on Jul. 5, 2012, 10 pages.
International Search Report and Written Opinion for Application No. PCT/US2010/061629 mailed on Feb. 24, 2011, 15 pages.

\* cited by examiner

*Primary Examiner* — Ted Wang
(74) *Attorney, Agent, or Firm* — Kilpatrick Townsend & Stockton LLP

(57) ABSTRACT

A method and an apparatus for achieving fast resynchronization of received signals in a time slice in DVB-T/H systems. When the clock drift is low, the location of the symbol window can be decided based on a previous time slice. When the clock drift is high and when there are large delay spreads, the location of the symbol window can be decided based on the detected scattered pilot positions. The placement of the symbol window can further be enhanced through processing of the received TPS bits.

9 Claims, 13 Drawing Sheets

Hypothesis 2: p = 6

Output2 = ABS(SUM(a(0), a(1), a(2) ...))

Hypothesis 3: p = 9

Output3 = ABS(SUM(a(0), a(1), a(2) ...))

FAST RESYNCHRONIZATION FOR RECEPTION IN TIME SLICING

CROSS-REFERENCES TO RELATED APPLICATIONS

The present application claims benefit under 35 USC 119 (e) of U.S. provisional application No. 61/289,272, filed Dec. 22, 2009, entitled "Fast Resynchronization for Reception in Time Slicing," the content of which is incorporated herein by reference in its entirety.

BACKGROUND OF THE INVENTION

The present invention relates to digital broadcasting systems, and in particular to fast resynchronization of OFDM receivers for digital video broadcasting-handheld (DVB-H) systems.

The DVB-H standard was derived from the DVB-T (DVB Terrestrial) standard. Time slicing is added to allow lower power consumption for handheld devices.

For DVB-H systems, certain scattered pilots (hereinafter "SPs") are regularly inserted in time- and in frequency-dimensions at a "boosted" power level to the OFDM symbols. The location of scattered pilots is described in clause 4.5.3 of the document ETSI EN 300 744 V1.5.1 (2004-06), which is hereby incorporated by reference.

For the OFDM symbol of index I (ranging from 0 to 67), carriers for which index k (frequency index) belongs to the subset $\{k=Kmin+3*(I \mod 4)+12p|p \text{ integer}, p>=0, k\in[Kmin; Kmax]\}$ are scattered pilots, wherein p is an integer that takes all possible values greater than or equal to zero, provided that the resulting value of k does not exceed the valid range [Kmin; Kmax]. (See clause 4.5.3 of ETSI EN 300 744 v1.6.1 (2009-01), which is incorporated herein by reference in its entirety).

FIG. 1 shows the frame structure indicating the location of scattered pilots (SPs). In addition to the scattered pilots described above, a frame also includes 177 continual pilots in the 8K mode and 45 in the 2K mode (see Table 7 of the ETSI EN 300 744 V1.5.1 (2004-06) document). Clause 4.6 of the ETSI EN 300 744 document also provides the Transmission Parameter Signaling (TPS) information which is transmitted in parallel on 17 TPS carriers for the 2K mode and on 68 carriers for the 8K mode. Every TPS carrier in the same symbol conveys the same differentially encoded information bit. Each TPS block, which corresponds to one OFDM frame contains 68 bits, defined as follows:

1 initialization bit;
16 synchronization bits;
37 information bits; and
14 redundant bits for error protection.

The SP positions are directly related to the OFDM frame. The detection of the frame boundary is the frame synchronization. For example, an initial OFDM symbol window location can be determined by correlating the cyclic prefix. In DVB-T systems, the frame synchronization is performed by correlating for the 16 TPS bits synchronization word. This frame synchronization approach can take 68 ms (one frame) to 136 ms (two frames). In some cases, the receiver needs to find the symbol number (0 to 67) for determining the position of the scattered pilots.

FIG. 2 is a diagram illustrating a conventional synchronization procedure in a DVB-T/H system, where a synchronization sequence must be performed in every time slice. A conventional receiver will need to wake up early to accommodate the following:

1. RF setting and calibrations;
2. AGC settling;
3. Initial window placement and coarse fractional frequency offset estimation;
4. Integer frequency offset estimation;
5. Frame resynchronization;
6. Echo detection and new FFT window placement (if needed);
7. Channel estimation, including fine symbol timing; and
8. Time drift due to clock error: residual clock ppm error× the time since last reception.

As can be seen in FIG. 2 and described above, a conventional receiver must wake up early to perform the many steps for the frame resynchronization such as enabling the RF frontend, calibrating the I/Q paths, setting the automatic gain control (AGC), correlating a cyclic prefix in order to place an initial OFDM window, estimating fractional and integer frequency offset, and demodulating the TPS carriers to extract the 16 TPS bits synchronization word.

Given the data duration is only around 100 ms in a time slice in DVB-H systems, the synchronization word based resynchronization itself will consume about 50% of the battery capacity. Therefore, it is important that the time for frame resynchronization be reduced.

BRIEF SUMMARY OF THE INVENTION

The present invention provides a method and an apparatus for improving resynchronization of received signals in a time slice by reducing the resynchronization time.

When the time drift between time slices (that occurs due to clock frequency offset) is low, an embodiment of the present invention may decide to locate the OFDM symbol window not based on a correlation of the cyclic prefix, but based on information obtained from a previous time slice after adjusting for the known clock drift. The frame synchronization based on the conventional correlation of the 16 TPS bits synchronization word can be bypassed. Thus, a fast resynchronization and low power dissipation can be achieved.

When the time drift between time slices is high and when there is long echo or large delay spread, positions of scattered pilots may be determined and the channel can be estimated based on the detected positions of the scattered pilots. Furthermore, the actual symbol number can also be determined by adjusting the expected symbol number with the detected scattered pilot positions. In an embodiment of the present invention, the accurate symbol number can be obtained when the uncertainty is about +/−1 symbol.

In another embodiment of the present invention, the accurate symbol number can further be ascertained by correlating received TPS bits with expected TPS bits. For example, if the correlation between the received and expected TPS bits indicates a different symbol number than the calculated symbol number based on the determined scattered pilot positions, then the symbol number from the TPS bit correlation will be employed.

Various embodiments of the present invention provide a very fast way of resynchronization and reduce thus the power consumption of a receiver significantly.

BRIEF DESCRIPTION OF THE DRAWINGS

The features and advantages of certain embodiments of the present invention will be more apparent from the following detailed description taken in conjunction with the accompanying drawings, in which.

DETAILED DESCRIPTION OF THE INVENTION

Exemplary embodiments of the present invention improve the performance of resynchronization in DVB-H systems in the current time slice by applying the OFDM symbol location adjustment calculated in a previous time slice. The performance of resynchronization can further be improved by adjusting the symbol number based on the determination of the SP positions. The accuracy of the symbol number can be further enhanced by correlating the received TPS bits with the expected TPS bits.

Figure 3:
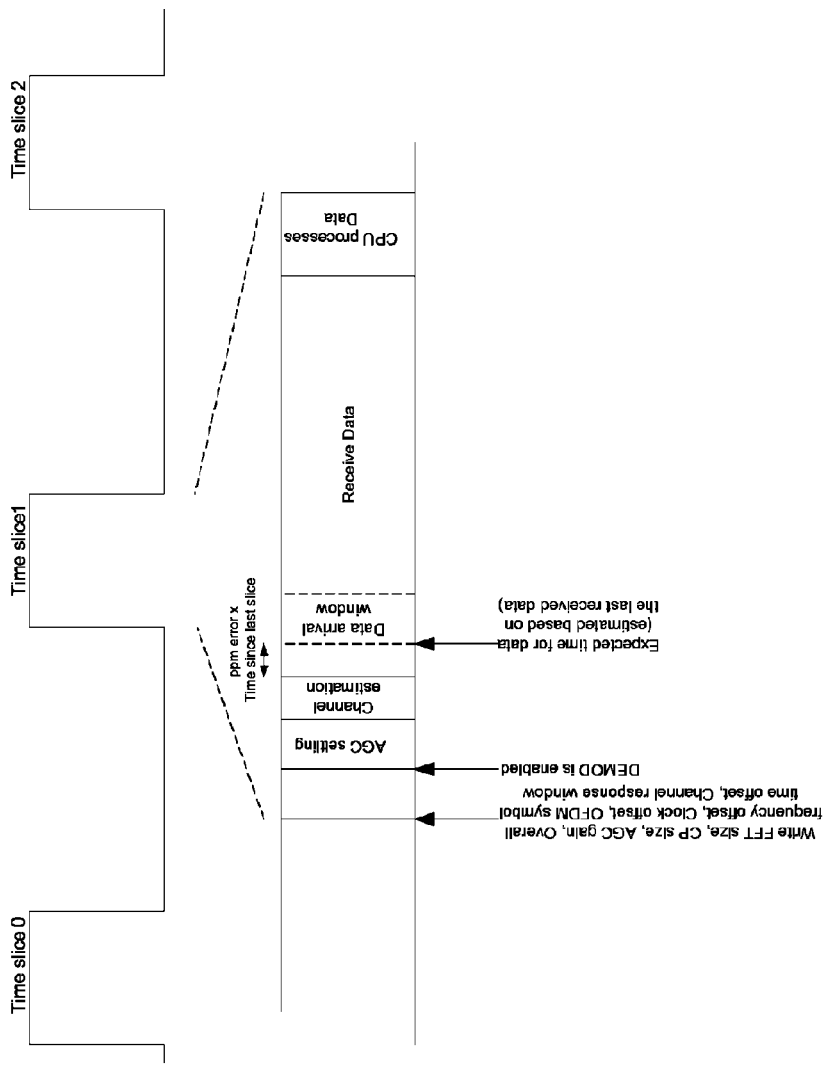
FIG. 3 is a diagram illustrating a DVB-H fast synchronization procedure according to an embodiment of the present invention.

In contrast to the prior art synchronization procedure, an embodiment of the present invention avoids many steps described above such as the initial window placement through the cyclic prefix correlation. Instead, the OFDM symbol window location is decided based on previous time slice (after adjusting for a known clock drift) and by applying the OFDM symbol location adjustment calculated in the previous time slice. It also skips the frame synchronization step of correlating for the 16 TPS bits synchronization word. An exemplary embodiment of a fast resynchronization for a low frequency drift is shown in FIG. 3, where the frame resynchronization through the cyclic prefix correlation and the TPS synchronization word extraction are not required.

Figure 4:
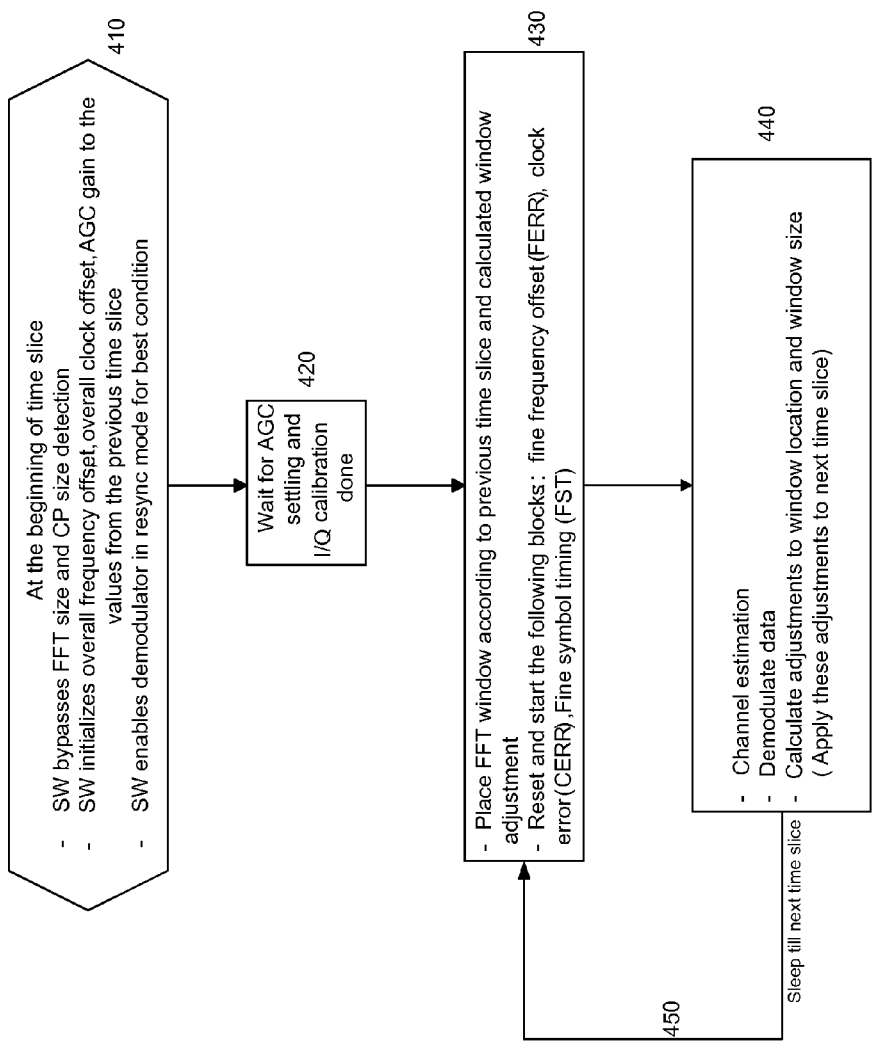
FIG. 4 is a flowchart illustrating an FFT window placement according to an embodiment of the present invention.

FIG. 4 is a flowchart illustrating an FFT window placement according to an embodiment of the present invention. This flowchart shows the steps for resynchronization where the clock frequency has a low drift. At step 410, a fast resynchronization reception device (described in detail later) bypasses the FFT size and the cyclic prefix CP detection and initializes the overall frequency offset, the overall clock offset, and the AGC gain to the values from the previous time slice. At step 420, the software program waits for the completion of the AGC and the I/Q calibration. At step 430, the program places an FFT window according to the previous time slice and calculates a window adjustment that is stored in a memory to be used for the next time slice. The fine frequency offset, clock error, and fine symbol timing blocks are initialized. At step 440, the channel is estimated and a window adjustment is calculated based on a difference between the estimated channel and an expected location. The window adjustment value is stored in a memory of the device to be used for the placement of the window in the next time slice. Information data is then demodulated. The device is set in the sleep mode at step 450 until the arrival of the next time slice.

Figure 5:
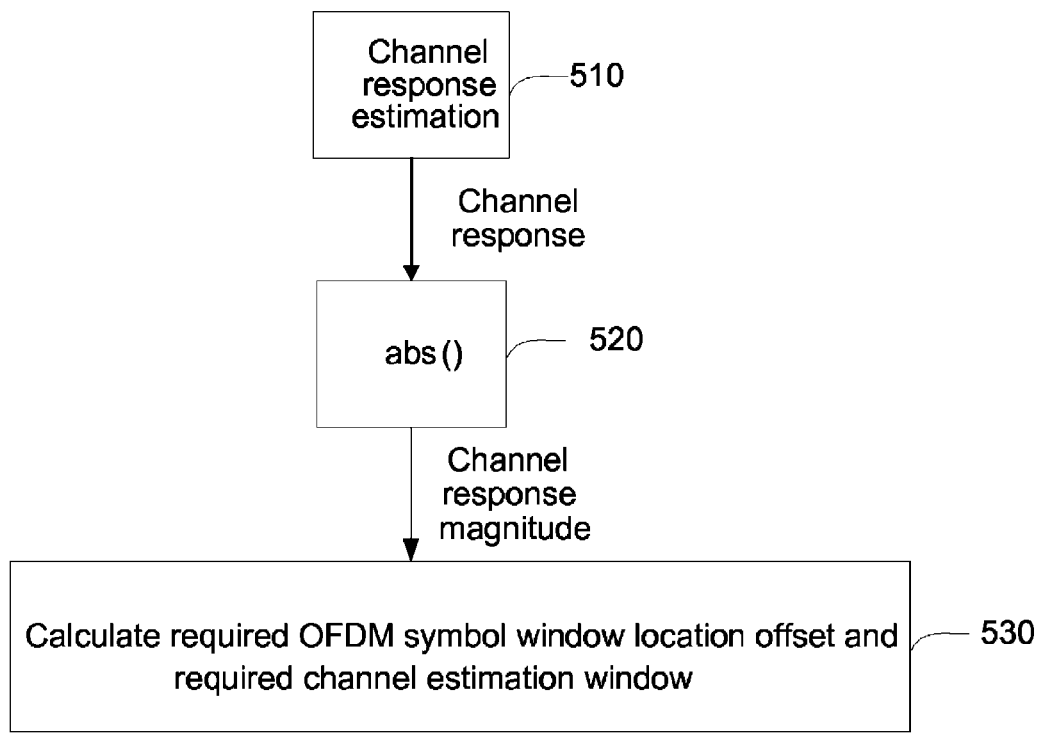
FIG. 5 is a flowchart illustrating a calculation of an OFDM symbol window location offset according to an embodiment of the present invention.

FIG. 5 is a flowchart illustrating the calculation of the OFDM symbol window location offset and the channel estimation window according to an embodiment of the present invention. At step 510, a channel response is estimated. At step 520, a magnitude of the channel response is obtained. At step 530, the OFDM symbol window location offset is calculated.

Figure 6:
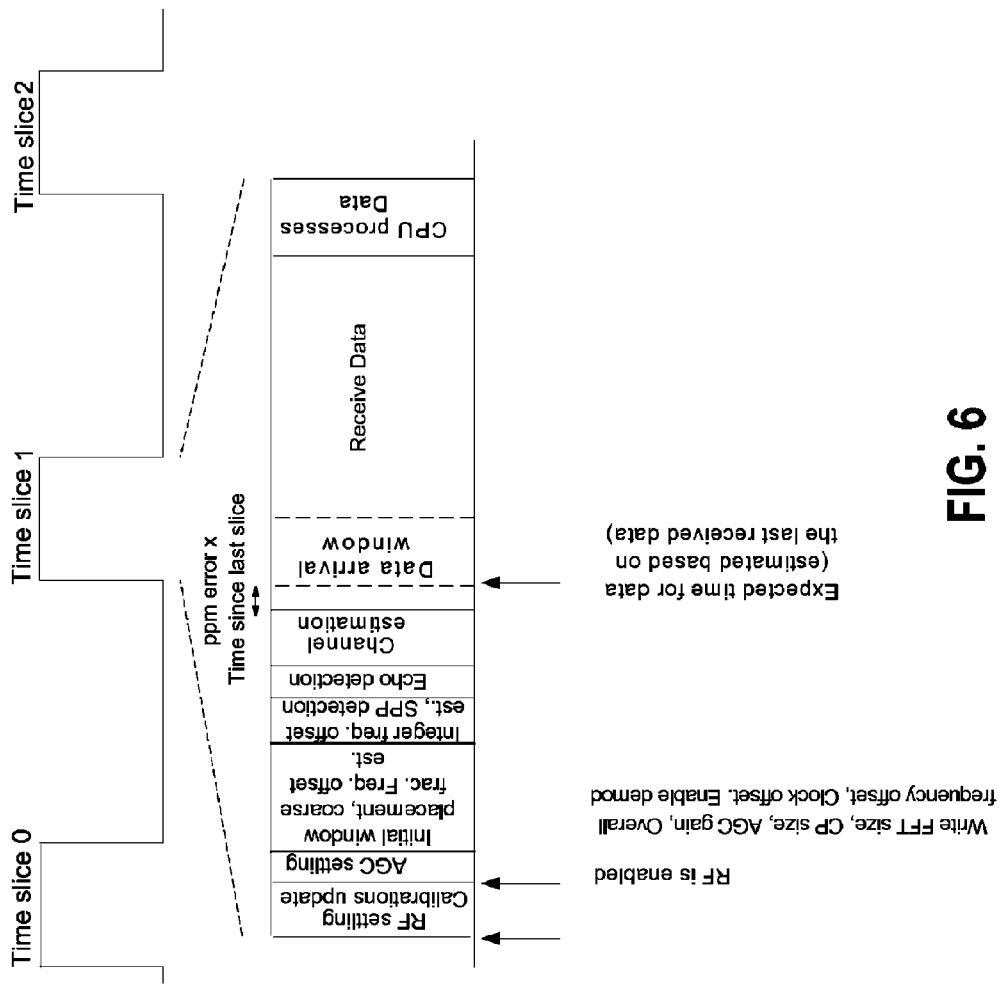
FIG. 6 is a diagram illustrating a DVB-H fast synchronization procedure according to another embodiment of the present invention.

FIG. 6 is a diagram illustrating another fast synchronization procedure according to another embodiment of the present invention, where the clock drift between time slices is relatively high and the channel faces long echo or large delay spread. Here, the resynchronization procedure starts by enabling the RF frontend and updating the I/Q calibration. The automatic gain control is set, and coarse fractional and integer frequency offset are estimated. Scattered pilot position is detected. Echo detection and channel estimation are performed. A time adjustment based on the clock drift is performed. In an exemplary embodiment of the present invention, the time adjustment can be calculated based on the accuracy of the reference clock (specified in ppm) multiplied by the time duration since the last time slice. The data arrival window can thus be estimated. This procedure is still much faster than the conventional frame synchronization using the 16 TPS bits synchronization word. As described above, the conventional approach can take one frame (68 ms) to two frames (136 ms) and consumes about 50 percent of the battery capacity when considering that the time slice is about 100 ms.

Figure 7A:
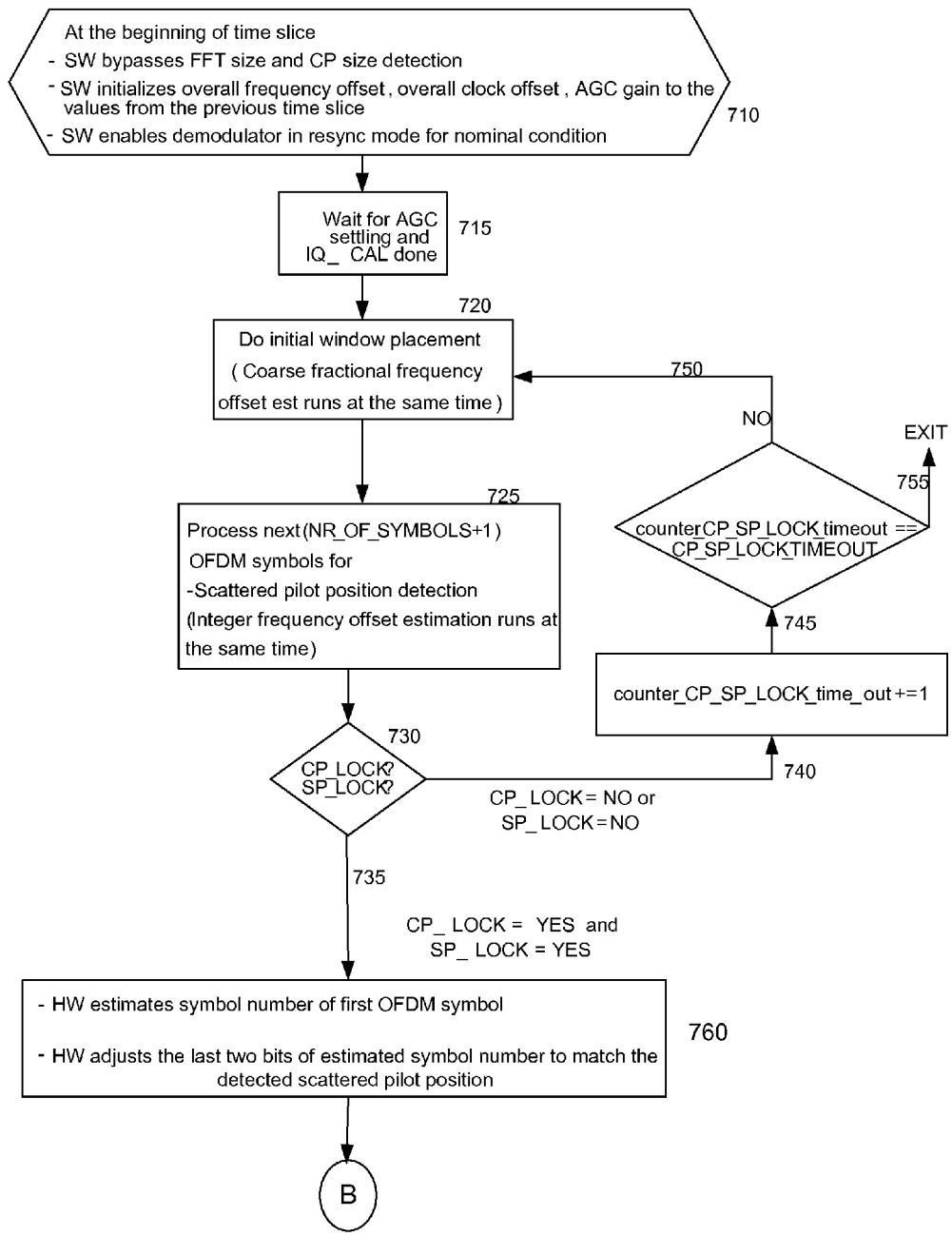
FIG. 7A is a flowchart illustrating an adjustment of the symbol number according to an embodiment of the present invention.
Figure 7B:
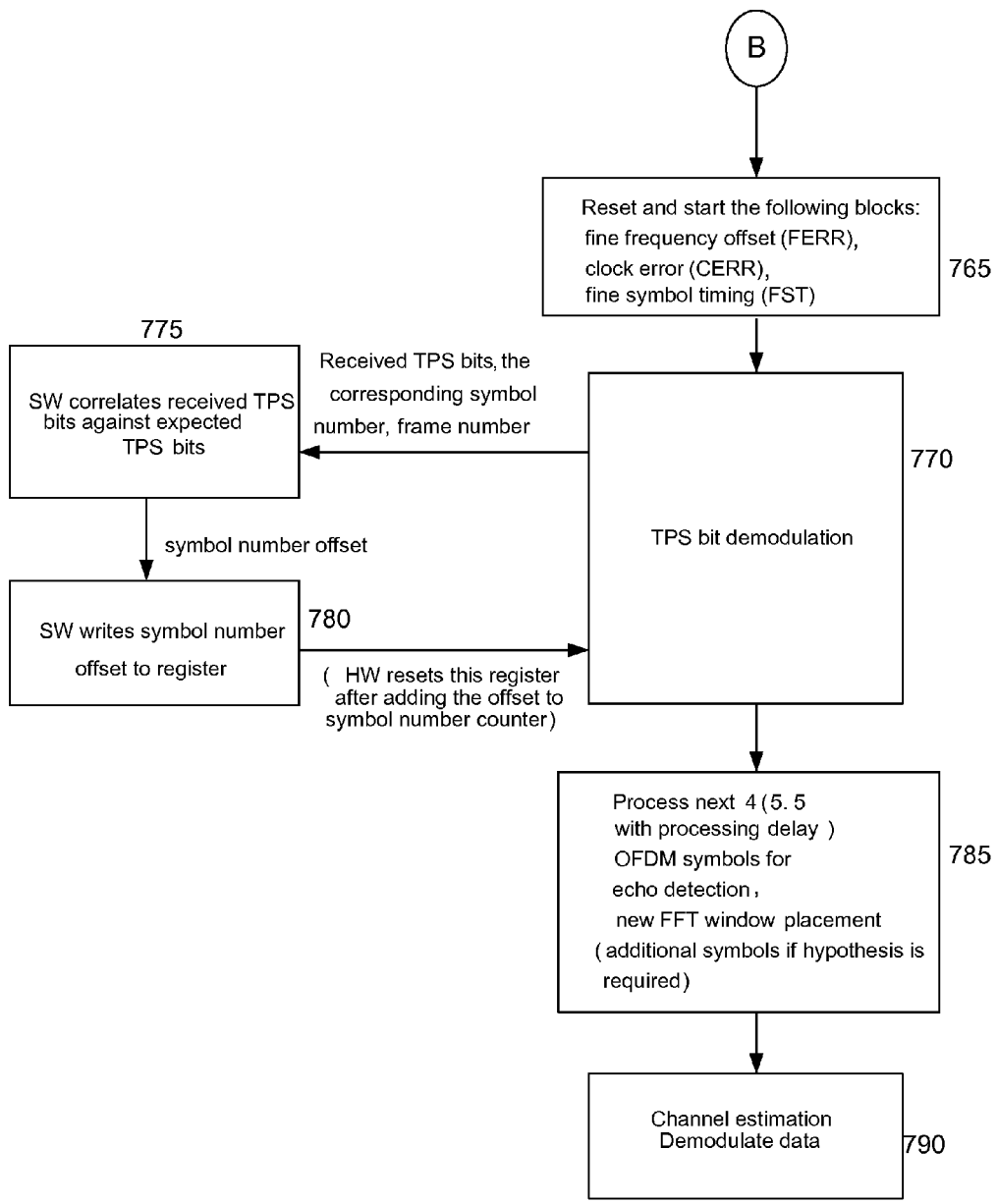
FIG. 7B is a flowchart illustrating a further adjustment of the symbol number according to an embodiment of the present invention.
Figure 8A:
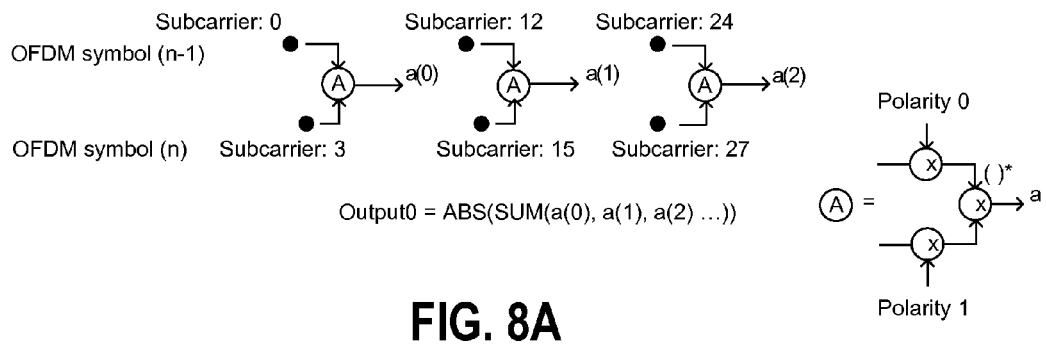
FIG. 8A is a diagram illustrating the determination of SP positions according to an embodiment of the present invention.
Figure 8B:
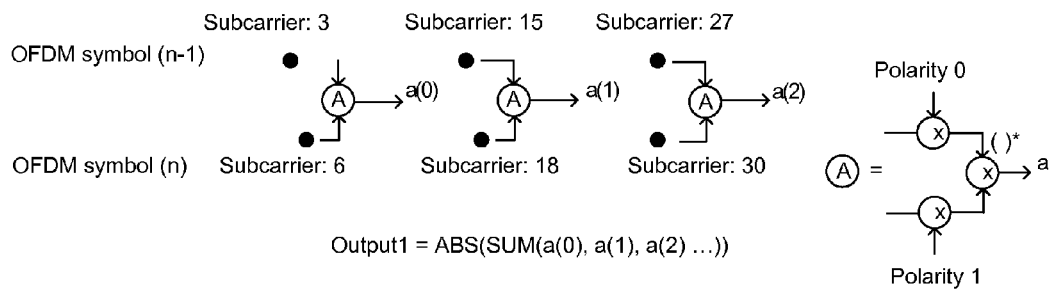
FIG. 8B is a diagram illustrating the determination of SP positions according to an embodiment of the present invention.
Figure 8C:
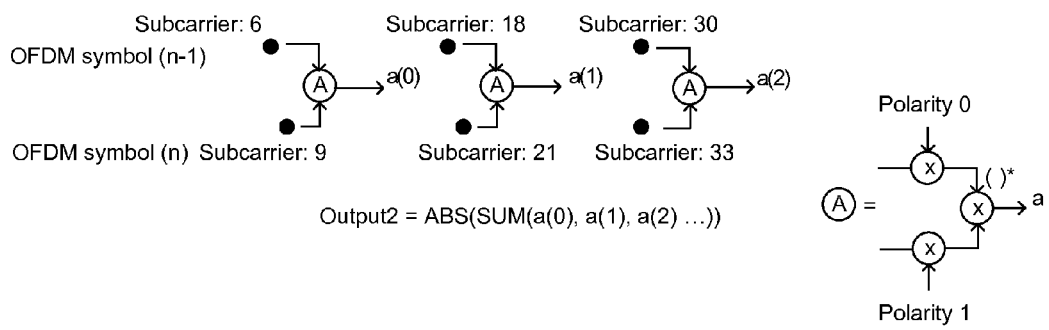
FIG. 8C is a diagram illustrating the determination of SP positions according to an embodiment of the present invention.
Figure 8D:
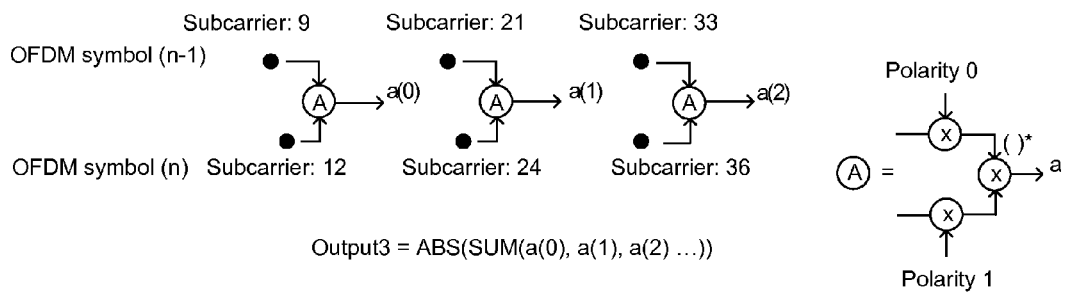
FIG. 8D is a diagram illustrating the determination of SP positions according to an embodiment of the present invention.

According to an embodiment of the present invention, the fast frame resynchronization scheme may comprise two stages. FIG. 7A is a flowchart illustrating the first stage and FIG. 7B is the flowchart illustrating the second stage.

Referring to FIG. 7A, the first stage simply detects the scattered pilot position and immediately starts the channel estimation based on the detected scattered pilot position. In addition, it calculates the actual symbol number by adjusting the expected symbol number with the detected scattered pilot position. This approach will give correct symbol number when the overall uncertainty is ±1 symbol.

At step 710, the receiver bypasses the FFT and CP size detection at the beginning of the time slice. The receiver also initiates the overall frequency offset, the overall clock offset, and the AGC gain to the values obtained from the previous time slice. At step 715, the receiver waits for the AGC to settle and the I/Q to be calibrated. At step 720, the receiver performs simultaneously the initial window placement and the coarse fractional frequency offset estimation. At step 725, the window will be shifted by 1 OFDM symbol to detect the scattered pilot position (SPP) and an integer frequency offset estimation is also performed at the same time. A straight forward detection of the SPP is illustrated in FIGS. 8A-8D that are described in detail in late sections.

At step 730, the receiver determines whether a lock condition for both the continual pilots (CP) and the scattered pilots (SP) is obtained. The receiver will proceed to step 735 (i.e., second stage) if both CP and SP are successfully detected. Otherwise, the receiver proceeds to step 740 that increases a CP_SP_timeout counter by 1. At step 745, the content of the CP_SP_timeout counter is compared with a predetermined timeout threshold value. If the content of the counter is not equal to the timeout threshold value, then the process returns to step 720 and start a new window placement. Otherwise, the process stops, i.e., the window placement fails to detect the scattered pilot position and estimate the integer frequency offset.

In an embodiment of the present invention, the position of scattered pilot is detected by cross-correlating symbol l with symbol l−1 for the four hypotheses p∈{0,3,6,9} and then by finding the hypothesis with the maximum correlation:

$$\hat{p} = \arg\max_{p \in \{0,3,6,9\}} \left| \sum_{m \in \{p, p+12, p+24, \ldots\}} [(1-2w_m)a^*_{l-1,m}][(1-2w_{m+3})a_{l,m+3}] \right|$$

where $a_{l,m}$ is the received value for $m^{th}$ sub-carrier in the $l^{th}$ symbol, and $w_m$ is the pilot polarity bit from the PRBS defined in section 4.5 of EN 300 744.

In order to minimize the resynchronization time, the scattered pilot position detection can use the same symbols used for integer frequency offset estimation. In this case, the carrier indices in the scattered pilot position detection will have to be adjusted by the integer frequency offset, in order to take into account the uncompensated integer frequency offset. The modified expression will be as follows $$\hat{p} = \arg\max_{p \in \{0,3,6,9\}} \left| \sum_{m \in \{p, p+12, p+24, \ldots\}} [(1-2w_m)a^*_{l-1,m+i}][(1-2w_{m+3})a_{l,m+3+i}] \right|$$

where i is the integer frequency offset.

Figure 1:
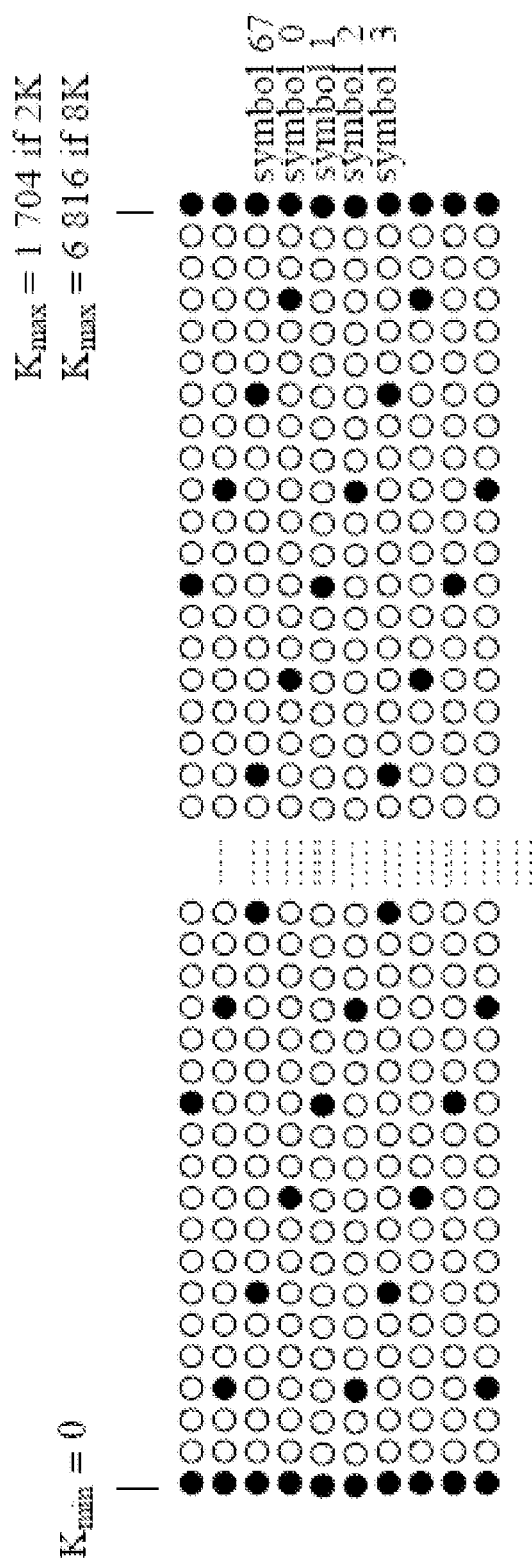
FIG. 1 is a diagram illustrating positions of scattered pilots (SPs) in DVB-T/H systems.
Figure 2:
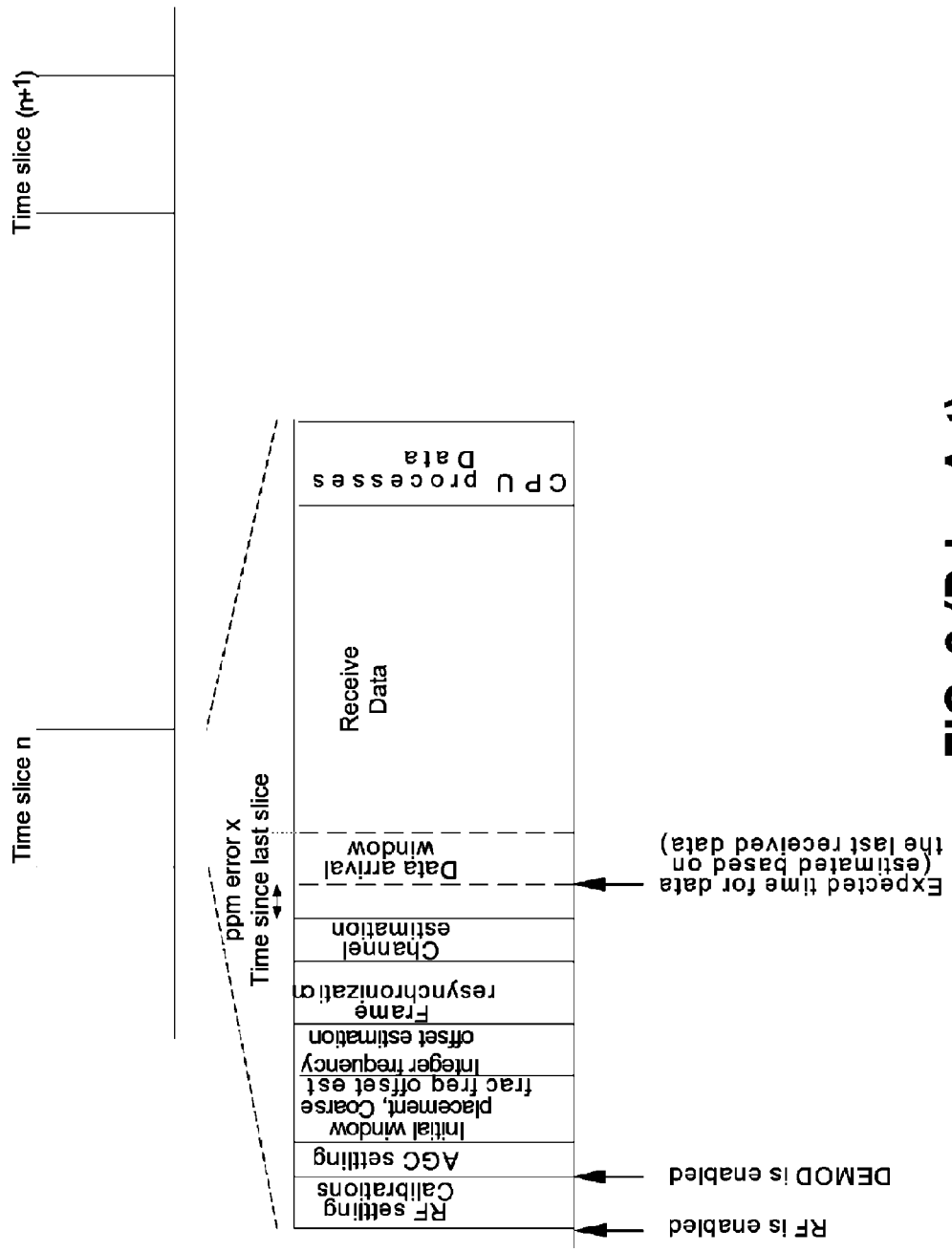
FIG. 2 is a diagram illustrating a conventional DVB-T/H synchronization procedure.

FIGS. 8A-8D illustrate the four hypotheses for detecting the positions of scattered pilots. The detection of the scattered pilot position is based on the fact that scattered pilots are shifted by three subcarriers between two consecutive symbols (see FIG. 1), so that the scattered positions can be estimated by correlating all four possible pilot positions between the two consecutive symbols.

At step 760, the receiver estimates the symbol number of the first OFDM symbol and adjusts the symbol number to match the detected scattered pilot position.

Referring to FIG. 7B, the second stage is performed to make sure that the symbol number calculated in the first stage is correct. This is done by correlating the received TPS bits with the expected TPS bits. If the TPS bits correlation indicates a different symbol number than the scattered pilot position based calculation, the symbol number from the TPS bits correlation is employed. At step 765, fine frequency offset, clock error, and fine symbol timing corrections are performed. At step 770, TPS bits are demodulated. At step 775, the received TPS bits are correlated against the reference sequence of TPS bits, around the expected frame and symbol numbers. The symbol number offset is determined. The symbol number offset is stored in a symbol number offset register that is reset after adding the offset number to a symbol number counter at step 780. At step 785, the receiver processes the next four OFDM symbols to determine the presence of echo and also to fine tune FFT window placement. In an embodiment, the receiver may process the next 5.5 OFDM symbols to account for some processing delay.

The first TPS bit in each frame of a super frame is used as initialization bit for differential BPSK modulation. Since the demodulated bits corresponding to these initialization bits may not be valid, the correlation will need to ignore these bits. This can be implemented by marking the first bit of each frame to DO NOT CARE in the reference sequence of TPS bits according to an embodiment of the present invention.

Figure 9:
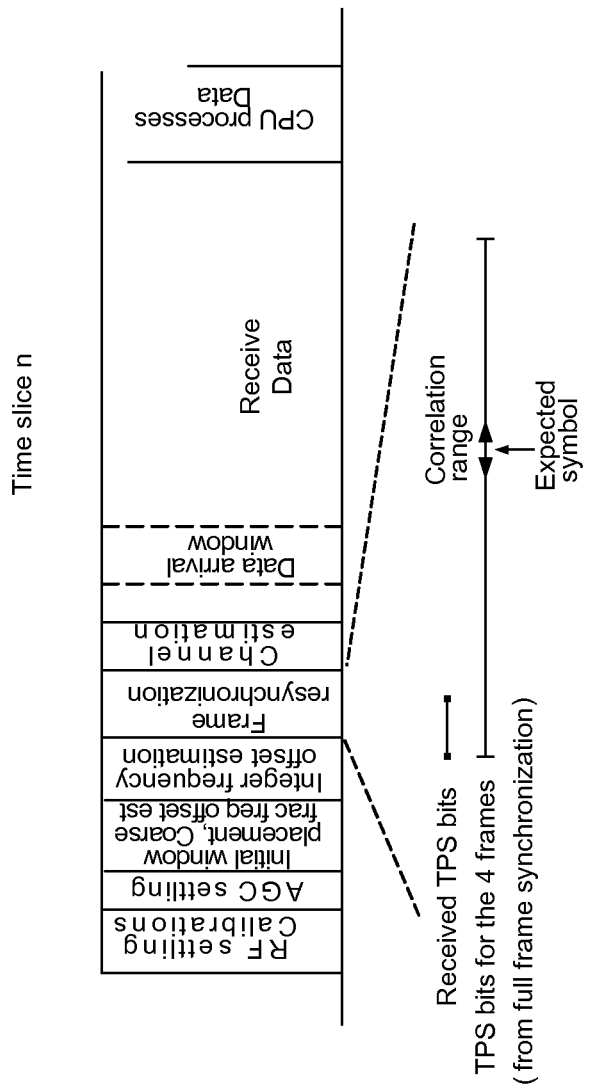
FIG. 9 is a diagram illustrating a symbol number calculation according to an embodiment of the present invention.

FIG. 9 is a diagram illustrating a symbol number calculation according to an embodiment of the present invention. The receiver will set the parameters of the RF frontend based on the values obtained from the last time slice. The receiver will wait a time period to have the AGC stabilized, the I/Q channels calibrated, and the IF or baseband signal converted to digital format. The next is to place an initial window for a coarse fractional frequency offset estimation and an integer frequency offset estimation. The symbol number calculation is based on the correlation of TPS bits that are just received, against the reference sequence of TPS bits (i.e. the TPS bits for four frames that were received in the first time slice through full frame synchronization). This correlation is done as follows:

First, compute the expected frame number and symbol number, based on the time that expired since the last time slice where Frame number of first symbol in time slice(n+1)=floor
({68×Frame number of last symbol in time slice
n+Symbol number of last symbol in time slice
n+CEIL([Time stamp of first symbol in time
slice(n+1)−Timestamp of last symbol in time
slice n]/OFDM symbol time)}/68)modulo 4; and Symbol number of first symbol in time slice(n+1)
={Symbol number of last symbol in time slice
n+CEIL([Time stamp of first symbol in time
slice(n+1)−Timestamp of last symbol in time
slice n]/OFDM symbol time)} modulo 68.

Then, correlate the received TPS bits against the reference sequence of TPS bits, around the expected frame and symbol numbers.

Figure 10:
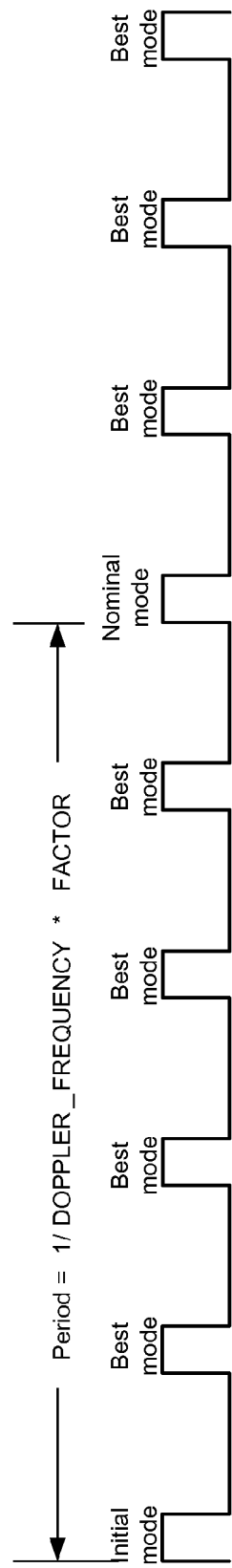
FIG. 10 is a diagram illustrating a hybrid case of a fast resynchronization procedure in DVB-H systems according to an embodiment of the present invention.

FIG. 10 illustrates a hybrid case of a fast resynchronization procedure according to an embodiment of the present invention. In the best case resynchronization mode, the receiver may skip detecting the initial OFDM symbol window location through correlation of CP. Instead, the receiver decides the OFDM symbol window location based on the previous slice after adjusting for known clock drift and by applying the OFDM symbol location adjustment calculated in the previous time slice. In an embodiment, the receiver may also skip the frame synchronization step of correlating for the 16 TPS bits synchronization word. Instead, the receiver decides the OFDM symbol number based on the previous time slice. In an embodiment, the receiver may perform the nominal mode in order to deal with a significant change in the channel. In a specific embodiment, the duration between successive nominal modes can be a function of Doppler frequency. In an example embodiment of the hybrid case, the duration can be equal to (1/DOPPLER_FREQUENCY)*FACTOR, where the Doppler frequency is determined by frequency shift caused by the motion speed of the receiver in relation to direction of the incoming signal. The Doppler frequency $f_D$ is calculated as:

$$fD = V * \frac{frf}{c} * \cos(\phi)$$

where:

v is the receiver velocity; frf is the carrier frequency of the transmitted signal; c is the speed of light; and φ is the angle between the motion direction and the incoming signal direction.

In an embodiment of the present invention for the nominal mode, the receiver may correlate the received TPS bits against the reference sequence of the TPS bits, around the expected frame and symbol numbers. If the TPS bits correlation indicates a different symbol number than the scattered pilot position based calculation, the receiver may employ the symbol number from the TPS bits correlation.

In an alternative embodiment of the present invention, the receiver may employ the best case and the nominal modes alternatively. In an example embodiment, the duration between successive nominal modes can be a function of Doppler frequency and equal to (1/DOPPLER_FREQUENCY) *FACTOR.

Figure 11:
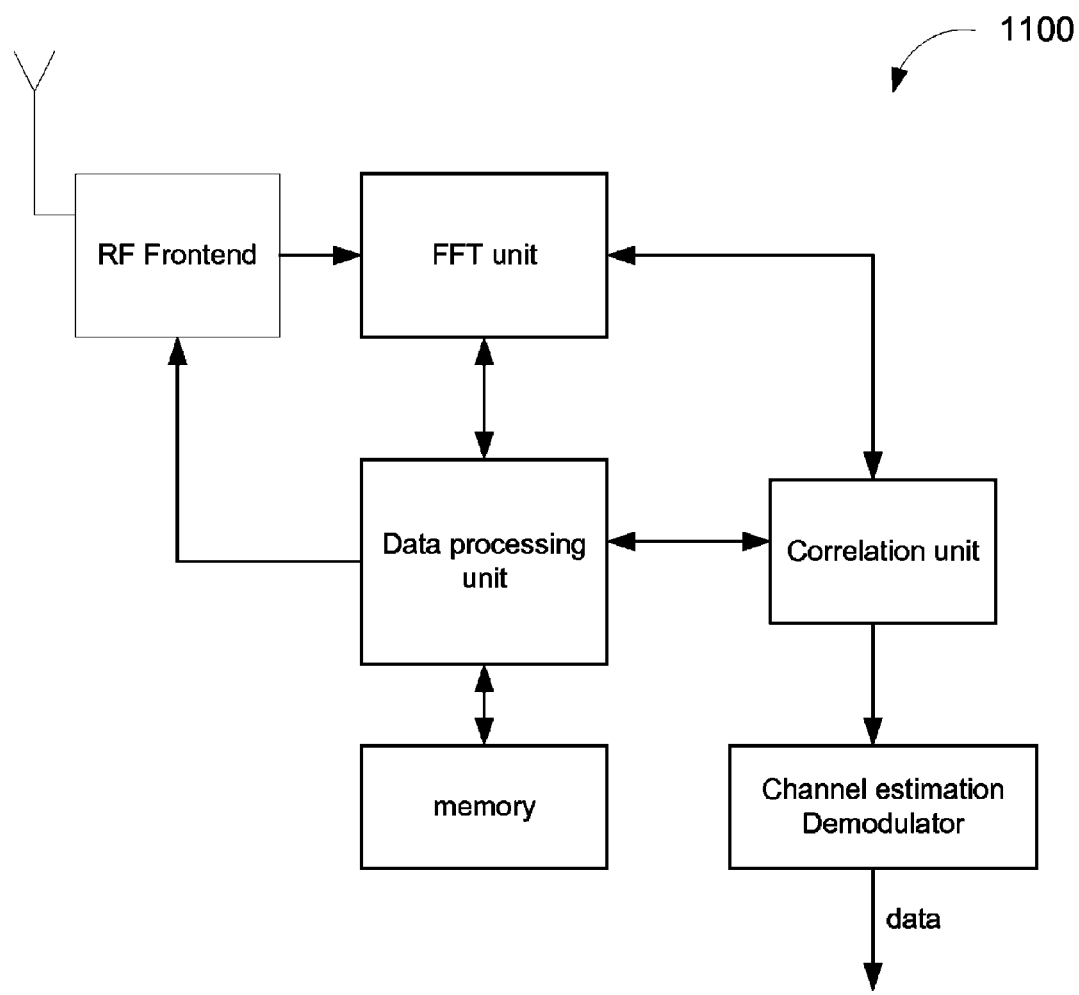
FIG. 11 is a simplified block diagram illustrating a general architecture of a fast resynchronization apparatus according to embodiments of the present invention.

FIG. 11 is a simplified block diagram illustrating a general architecture of a fast resynchronization receiver 1100 where some principles of the embodiments of the present invention can be applied. An RF frontend module may include a low noise amplifier that amplifies a received DVB-H RF signal to an appropriated signal level for a down-mixer before frequency translating it to an intermediate frequency (IF) or a baseband signal. The RF front end module further includes an automatic gain control (AGC) circuit to adjust the IF or baseband signal for a subsequent analog digital converter that converts the IF or baseband signal to digital data for further processing. A portion of the RF frontend will be turned on just before the arrival window of the time slice under the control of a data processing unit in order to conserve power. The processing unit is coupled with a FFT unit and a correlation unit. In an embodiment, the data processing unit may perform a fast re-synchronization by setting the AGC to the last value before the receiver goes to a sleep mode and bypassing the FFT and CP size estimation. The data processing unit performs the window placement, the detection of the scattered pilot positions and many other functions described in the above sections together with the FFT and correlation units. The processor unit is further coupled to a memory unit that stores program instruction codes and relevant data for running the processes described above and the many other operations of the receiver.

In an embodiment, the data processing unit may include a microprocessor running software or program instruction codes stored in the memory module. The data processing unit controls the operations of the receiver using the software. In an exemplary embodiment, the data processing unit sets the parameters of the RF front end module based on the values obtained from the last time slice and stored in the memory module. In an embodiment, the data processing unit may instruct the receiver to skip detecting initial OFDM symbol window location through correlation of the continual pilots, and use the OFDM symbol window location based on a previous time slice. In another embodiment, the data processing unit may correlate the received TPS bits against a reference sequence of TPS bits. And if the TPS bits correlation indicates a different symbol number than the one obtained from the calculated scattered pilot position, then the data processing unit will instruct the receiver to use the symbol number from the TPS bits correlation.

In an embodiment, the data processing unit may include a lock detector that determines whether a lock condition for both the continual and scattered pilots exists. In the event that the lock condition exists, the data processing unit estimates a symbol number of the received OFDM symbol and adjusts the last two bits of the estimated symbol number to match the detected scattered pilot position. The data processing unit also includes a timeout counter whose content is augmented by one each time that the lock condition is not met. As long as the timeout counter does not exceeds a predetermined threshold value, the data processing unit instructs the received to place a new window and continue to detect the scattered pilot position in the received OFDM symbols. In an embodiment, the software correlates the received TPS bits against expected TPS bits and determines a symbol number offset value. The software writes the symbol number offset value to a symbol number offset register in the processing unit, which resets the symbol number offset register after adding the symbol number offset value to a symbol number counter.

It will be appreciated that the fast resynchronization method and apparatus of the present invention described herein may be implemented by various means. For example, these techniques may be implemented in hardware, firmware, software or a combination thereof.

As described above, the fast resynchronization techniques disclosed herein can be utilized in data communications systems where time-slicing mechanisms are utilized, i.e., data is transmitted and received in burst in order to extend the battery life. Although the exemplary embodiments of the present invention use the DVB-H system, they may also be applied to other similar mobile communications systems such as the CMMB (China Multimedia Mobile Broadcasting). The principles defined herein may be applied to other variations without departing from the spirit or scope of the disclosure.

What is claimed is:

1. A method of fast resynchronization for reception in a time slicing mode having an idle time duration disposed between adjacent time slices, the method comprising:
    receiving a first signal in a first time slice;
    estimating a window location associated with the first time slice;
    obtaining an adjustment to the window location based on a difference between the estimated window location and an expected window location;
    receiving a second signal in a second time slice; and
    placing a second window location in the second time slice in accordance with the obtained adjustment to achieve the resynchronization;
    wherein the second signal is received following an expiration of the idle time duration after receiving the first signal;
    wherein the first signal includes a first OFDM symbol; and
    wherein the second signal includes a second OFDM symbol each of the first and second OFDM symbols including a plurality of pilots and scattered pilots.

2. The method of claim 1 wherein the estimating a window location comprises:
    detecting the position of the scattered pilots;
    estimating a channel based on the detected pilot position.

3. The method of claim 2 further comprising:
    determining whether a lock condition for both the pilots and the scattered pilots has been obtained;
    in the event that the lock condition has been obtained, estimating a first symbol number of the first OFDM symbol and adjusting the first symbol number to match the detected scattered pilot position; and in the event that the lock condition for either one of the continual and the scattered pilots has not been obtained, increasing a timeout counter by one.

4. The method of claim 3 further comprising:

determining whether the content of the timeout counter exceeds the predetermined timeout threshold value; and restarting the window placement in the event that the content of the timeout counter does not exceed the predetermined timeout threshold value.

5. The method of claim 3 further comprising:

extracting a plurality of TPS bits;

correlating the plurality of extracted TPS bits with a plurality of expected TPS bits;

in the event that the extracted TPS bits do not match the expected TPS bits, determining an offset value between the extracted TPS bits and the expected TPS bits and storing the offset value in an offset register.

6. The method of claim 5 further comprising:

adding the offset value to a symbol number counter; and resetting the offset register.

7. The method of claim 1 further comprising:

storing a value of the adjustment in a memory.

8. The method of claim 7 further comprising:

idling the reception between the first and second time slices.

9. The method of claim 1 wherein estimating a window location comprises:

estimating a channel response; and obtaining a magnitude of the channel response.

\* \* \* \* \*